United States Patent [19]
Johnson

[11] Patent Number: 4,986,158
[45] Date of Patent: Jan. 22, 1991

[54] MODULAR MULTIPLE MUSICAL INSTRUMENT STAND

[76] Inventor: Stefan J. Johnson, R.R. 1, Box 141, Warren, Minn. 56762

[21] Appl. No.: 314,111

[22] Filed: Feb. 23, 1989

[51] Int. Cl.$^5$ ............................................. G10G 5/00
[52] U.S. Cl. .................................. 84/327; 84/385 A; 84/387 A; 84/421; 84/453
[58] Field of Search ................... 84/327, 329, 385 A, 84/387 A, 421, 453

[56] References Cited

U.S. PATENT DOCUMENTS

| | | | |
|---|---|---|---|
| 1,612,148 | 12/1926 | Oettinger | 84/327 X |
| 3,958,786 | 5/1976 | Mann | 84/453 X |
| 4,036,462 | 7/1977 | Sheftel | 84/453 X |
| 4,353,480 | 10/1982 | Gathright | 84/327 X |

FOREIGN PATENT DOCUMENTS

| | | | |
|---|---|---|---|
| 1198097 | 12/1985 | Canada | 84/421 |
| 3428475 | 2/1986 | Fed. Rep. of Germany | 84/453 |

Primary Examiner—Lawrence R. Franklin
Attorney, Agent, or Firm—Richard C. Litman

[57] ABSTRACT

A modular construction, multiple musical instrument stand may be quickly assembled or disassembled for use in the stage or performing environment. The stand contains a plurality of quickly and easily performed adjustments so that various types and sizes of musical instruments may be supported by the stand, and is expandable so that any desired number of instruments may use the stand by adding additional supports during assembly. Further features may be added, such as trays or other types of containers, in the same manner as the assembly of other components of the stand. The stand may be further expanded by using the telescoping crossmembers to widen the base as necessary for the installation of additional musical instrument supports as desired. In a further embodiment, the upright portion of the stand may be folded horizontally against the base for compact storage.

11 Claims, 2 Drawing Sheets

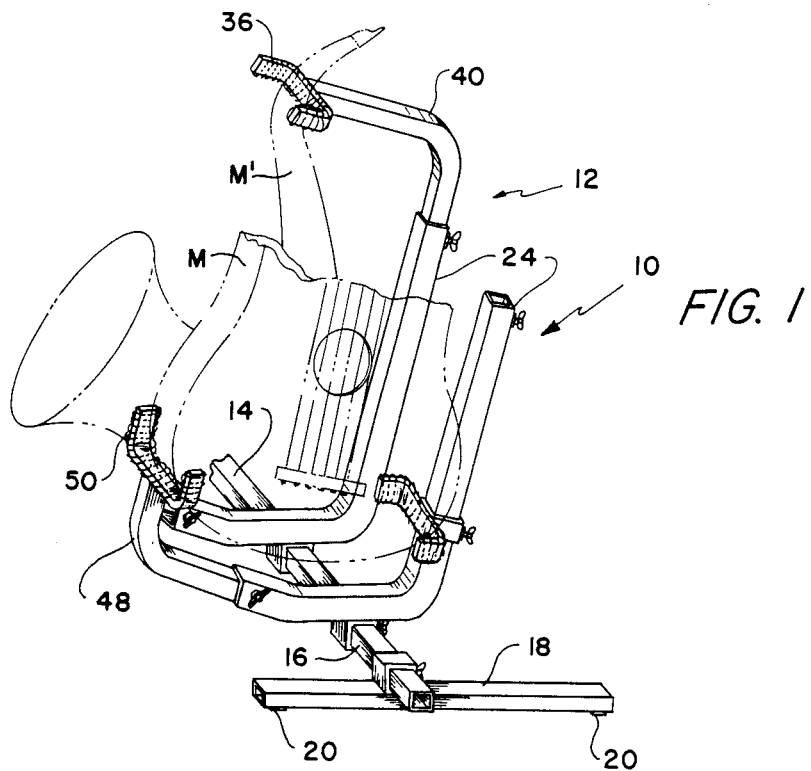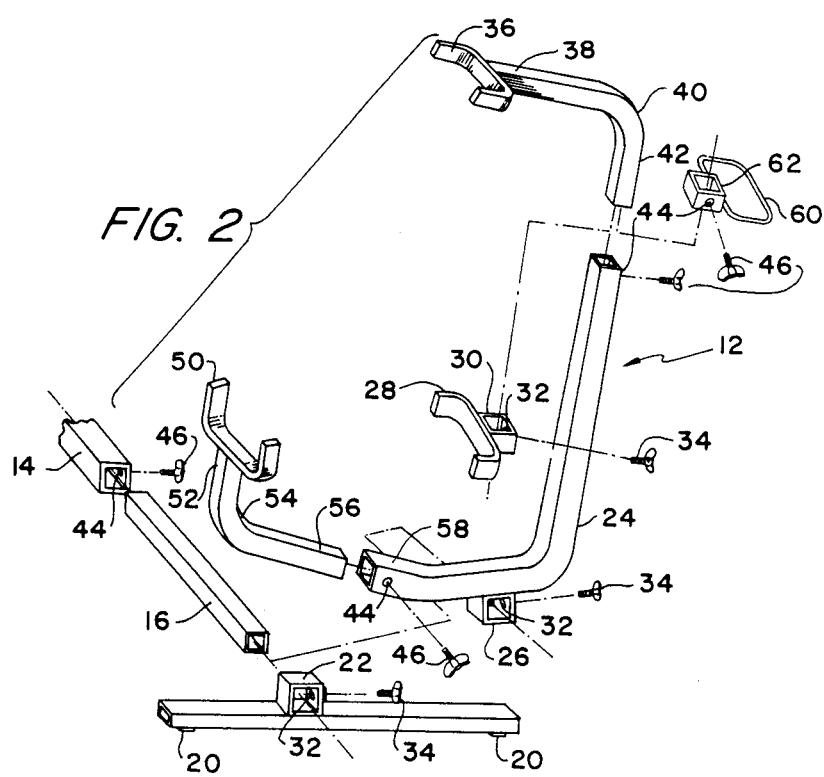

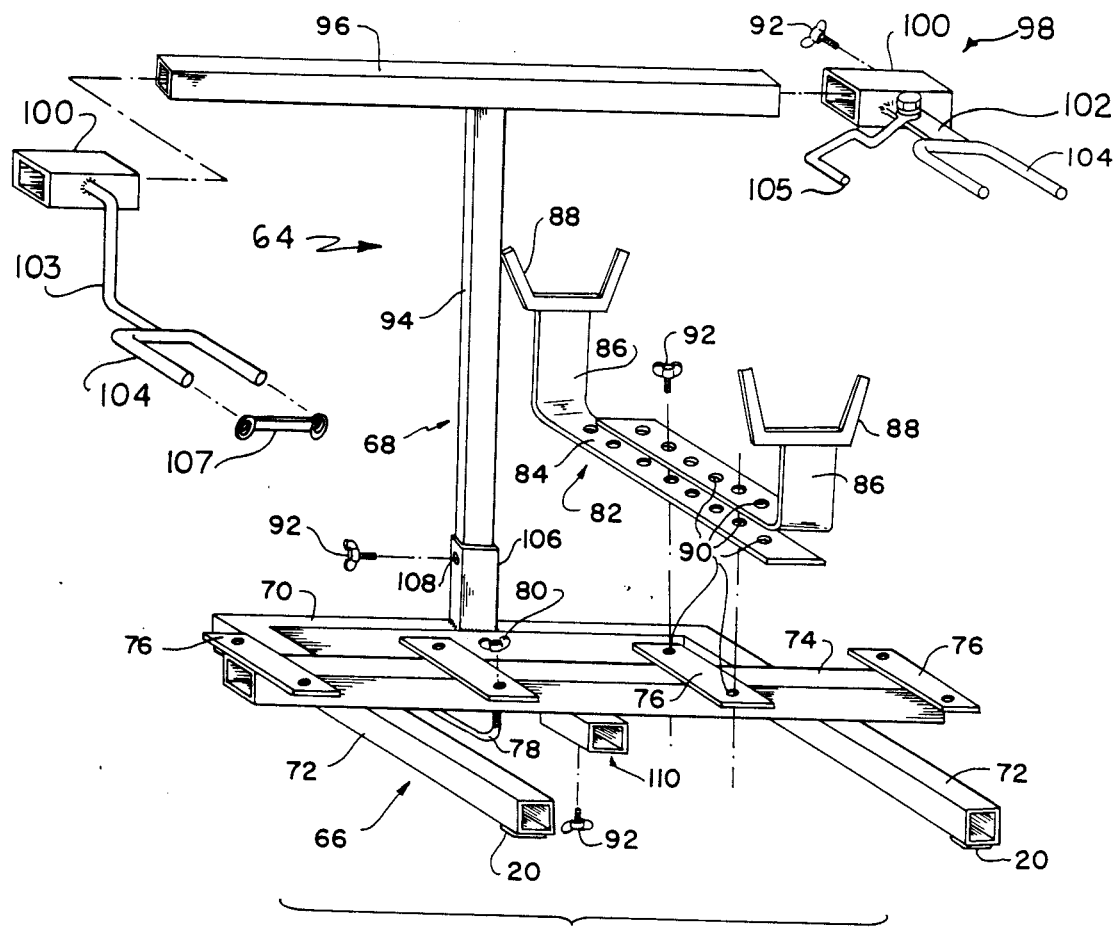
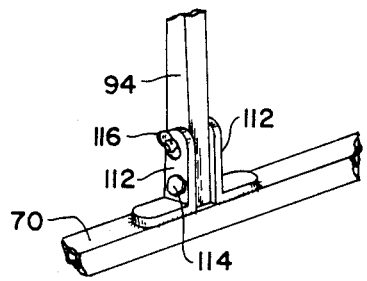
FIG. 3
FIG. 4

MODULAR MULTIPLE MUSICAL INSTRUMENT STAND

FIELD OF THE INVENTION

This invention relates generally to musical instrument storage racks and stands, and more particularly to an easily assembled and disassembled adjustable stand for the temporary storage of a plurality of musical instruments.

BACKGROUND OF THE INVENTION

The field of the performing arts is very fast paced, particularly in the form of live performances. It is essential that breaks or periods of inaction be kept to a minimum in order to hold the attention and interest of the audience.

A continuous problem is the temporary storage of equipment to be used on stage, particularly musical instruments. Such instruments are generally relatively large and fragile and are at some risk when placed casually in the general stage area. A solution is the storage of such musical instruments offstage, but the delays ensued in retrieving a given instrument from an offstage location may serve to break the continuity of a performance. The need arises for a device capable of temporarily storing a plurality of various musical instruments for rapid retrieval and storage, particularly in the performing environment. Such a device must be capable of ready assembly and disassembly, as the duration of a typical musical performance is a matter of only a few hours at most.

DESCRIPTION OF THE RELATED ART

Musical instrument storage devices in the form of enclosed instrument cases are of course well known. Relatively few open racks for the temporary storage and quick retrieval of musical instruments are known; most such devices are used in music shops, but these are generally not specifically designed or intended to allow rapid storage or removal of the instruments. In many cases the opposite effect is desirable for reasons of security.

Hasterok et al. U.S. Pat. No. 1,774,096 discloses a musical instrument holder which provides easy accessibility, but in doing so much stability is lost. Also, the device may only be used for the temporary storage of a single instrument. Sherrard U.S. Pat. No. 2,058,184 discloses a musical instrument storage rack for a plurality of stringed instruments. This device is primarily intended for use in the school environment, in which a plurality of like instruments must be temporarily stored. More-over, no provision is made for rapid or easy disassembly of this device, as such a feature is generally unnecessary in the intended environment.

Mann U.S. Pat. No. 3,958,786 and Gathright U.S. Pat. No. 4,352,480 disclose collapsible folding devices for the temporary storage of musical instruments, particularly stringed instruments. While these devices serve some of the needs addressed by the present invention, they are capable of storing a maximum of two instruments in the case of the Gathright patent, and instruments are placed in the stand facing outward rather than storing such instruments edgewise to conserve storage space. None of the above noted patents are seen to disclose the specified arrangement of concepts disclosed by the present invention

SUMMARY OF THE INVENTION

By the present invention, an improved device for the temporary storage of musical instruments is disclosed.

Accordingly, one of the objects of the present invention is to provide a device capable of being quickly and easily assembled and disassembled.

It is another object of the present invention to provide a device of a modular nature which can be easily expanded to provide storage for varying numbers of instruments as necessary.

It is a further object of the present invention to provide a device which is adjustable, so as to provide storage for a variety of different types and sizes of instruments.

It is an additional object of the present invention to provide a device which is capable of storing such instruments in a relatively limited space.

Yet another object of the present invention is to provide a device which provides rapid and easy access and storage of such instruments.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is a fragmented perspective view of the musical instrument stand in its assembled state. showing how various instruments may be stored thereupon.

FIG. 2 is an exploded perspective view of the stand, disclosing its various components.

FIG. 3 is a perspective view of an alternate embodiment of the stand.

FIG. 4 is a fragmented perspective view of a folding arrangement for the stand.

Similar reference characters designate corresponding parts throughout the several figures of the drawings.

DESCRIPTION OF THE PREFFERED EMBODIMENT

Referring now to the drawings, particularly FIG. 1, the present invention will be understood to relate to an improved stand for the temporary storage of musical instruments. Stand 10 is preferably formed of various sizes of square section steel tubing and comprises a plurality of musical instrument holder assemblies 12 which are attached to crossmember components 14 and 16, which in turn are assembled to two or more legs 18. Square, or at least non-circular, cross section tubing is the preferred material, as several components are formed so as to telescope together for adjustability as described below. By using such tubing the non-circular shape of such material naturally establishes a constant angular relationship between telescoping sections, thus maintaining the general structural shape of the stand. For economy of manufacture, round bar stock or tubing may be substituted where such substitution may be appropriate. Crossmember component 16 is of a size permitting it to telescope within component 14, and may be secured by a threaded fastener such as a knobbed bolt or thumbscrew 46 threaded into a hole 44, more clearly shown in FIG. 2. Legs 18 may contain feet 20 at or near each end, which may be formed or coated with a rubber or plastic material in order to reduce slippage.

FIG. 2 discloses further details of stand 10. Each leg 18 also contains a bracket 22 near the center of each leg 18, consisting of a section of square tubing approximately equal in length to the width of each leg 18. Brackets 22 are fashioned of a size slightly larger than each crossmember component 14 and 16 in order that components 14 and 16 may be inserted into brackets 22 on each leg 18. Brackets 22 are preferably attached to each leg 18 by welding, or may be attached by other suitable means. Crossmember components 14 and 16 are similarly fashioned of slightly different sizes of tubing in order that component 16 may telescope into and closely fit within crossmember 14.

Base component 24 is assembled to crossmember component 14 or 16 by means of bracket 26, which is welded or otherwise attached to component 24. Side supports 28, consisting of generally U-shaped components as viewed from above, are equipped with brackets 30 of a similar fashion to brackets 22 and 26. Bracket 30 may be assembled to base component 24 to support the approximate midpoint of any musical instrument M, M' or the like desired to be stored in stand 10, as may be seen in FIG. 1. Each bracket 22, 26, and 30 is equipped with a threaded hole 32 in which threaded fastening means such as knobbed bolts or thumb-screws 34 may be installed in order to firmly secure brackets 22, 26, and 30 and the components 18, 24, and 28 to which they are attached to comprise portions of stand 10. Side support 28, as well as other instrument supports described below, are padded in order to protect any instrument placed on such supports.

Upper support 36 consists of a generally U-shaped component, similar to side support 28. Support 36 is attached to horizontal end 38 of a generally L-shaped arm 40. Arm 40 also contains a generally vertical member 42, which may telescope within the upper end of base component 24 and be secured therein by means of a threaded hole 44 near the upper end of component 24 and a thumbscrew 46 which may be inserted into hole 44 and secured in a manner similar to that used for brackets 22, 26 and 30.

Lower support 48 comprises a generally U-shaped component 50, fashioned in a similar manner to components 28 and 36. Component 50 is preferably attached to one end 52 of a square tube 54, fashioned in a manner allowing component 50 to lie in an essentially vertical plane. Tube 54 is angled so that lower end 56 may telescope within the lower end 58 of base component 24. Lower support 48 may be secured by means of a thumbscrew 46 threaded into a hole 44 in end 58 of base component 24, in a similar manner to arm 40.

To further increase the utility of stand 10, trays 60 or similar containers may be added. Tray 60 is attached by welding or other suitable means to a bracket 62, which in turn may be secured to upper support component 40 by means of a threaded hole 44 and a thumbscrew 46, in the same manner as that used with other brackets 22, 26 and 30.

Stand 10 is preferably used on stage and/or in the musical performing environment, where its advantages of compact size when in the disassembled state and ease of assembly and disassembly may be appreciated. Before a performance stand 10 may be assembled as described above and shown in FIGS. 1 and 2. Any number of musical instrument holder assemblies 12 may be assembled upon cross member components 14 and 16 as desired. As a great variety of musical instruments M, M' and others not shown may typically be used in a performance, the wide adjustability of components 28, 40 and 48 permits the temporary storage of such instruments M, M' and the like in a secure manner. If desired, a tray or trays 60 or similar device may be assembled upon arm 40 for the temporary storage of various items such as guitar picks and other instrument accessories, electronic components, drinks, ash trays and the like. Instruments M, M' and/or others not shown may be placed on stand 10 as desired, quickly retrieved as the performance may require, and quickly replaced when the particular portion of the performance requiring the use of that instrument is completed.

When the entire performance has been completed, instruments M, M' and/or others may be removed from stand 10 and placed in their respective cases, whereupon stand 10 and its associated components may be easily disassembled and stored, if so desired, and/or transported for storage or to the location of the next performance where it may be reassembled for further use.

Alternatively, stand 10 may be constructed in a simplified form, as disclosed in the stand 64 of FIG. 3. The two primary components of stand 64 are base 66 and upper support 68, which serve the same functions as components 14, 16, 18 and 24 of stand 10. Base 66 comprises a horizontal crossmember 70 and two or more legs 72 which are welded or otherwise securely attached to crossmember 70. Legs 72 may contain feet 20 at or near each end, in a similar manner to that of legs 18 of stand 10.

Base 66 also contains a lower support crossmember 74, welded or otherwise securely attached to legs 72. A plurality of brackets 76 are in turn attached to crossmember 74. Temporary attachment so as to permit adjustability may be done with U bolts 78 and wing nuts 80. Brackets 76 are used for the attachment of lower instrument supports 82, which contain horizontal members 84 and vertical members 86 to which padded support members 88 are attached. Horizontal members 84 and brackets 76 may be equipped with a plurality of holes 90 to provide for adjustment, and may be secured with thumbscrews 92 similar to screws 34 and 46 of FIG. 2.

Upper support 68 comprises vertical member 94 and horizontal member 96. Member 96 is welded or otherwise securely attached to the top of member 94, so that the assembled upper support 68 is in the general form of a "T". Horizontal member 96 is preferably of approximately equal length to crossmember 70, and may contain a plurality of upper support brackets 98. Brackets 98 may be temporarily attached to horizontal member 96 by means of rectangular tube 100. of a size to fit over horizontal member 96, and secured with a thumbscrew 92. Upper support extension 102 and padded support member 104 may be secured directly to horizontal member 96 in order to further simplify the construction of stand 64 if adjustability is not required. Alternatively, a depending upper support extension 103 may be formed to allow support for the necks of smaller instruments M, M'. In this way, the lower portion of such smaller instruments M, M' may still rest in the lower support brackets 88. A retainer 105 may also be added to upper support bracket 98 to further retain or suspend such smaller instruments M, M' from the neck, thus eliminating the need for lower support for sufficiently small and/or lightweight instruments. Yet another means of accomplishing such retention may be by use of an elastic band 107 of a proper size to extend across the ends of U-shaped member 104.

Crossmember 70 may be equipped with socket 106, formed of rectangular tubing of a size to allow the lower end of vertical member 94 to fit closely within socket 106. Member 94 may be retained within socket 106 by means of a thumbscrew 92 engaging a threaded hole 108 in the base of socket 106. By removing screw 92 from the base of socket 106, upper support 68 may be removed from base 66 for more compact storage. Support 68 may then be secured to base 66 by means of tube 110, which is of a size to allow support 68 to fit within tube 110. Support 68 may be secured within tube 110 with a thumbscrew 92 similar to other such securing devices used in the invention.

Alternatively, vertical member 94 of support 68 may be secured to crossmember 70 by means of brackets 112 as shown in FIG. 4. Brackets 112 may be welded or otherwise securely fastened to crossmember 70 and contain a bolt or pin 114 which also passes through the lower end of vertical member 94, member 94 and support 68 thereby being allowed to pivot about bolt 114 for storage. Member 94 and support 68 may be secured for use by aligning support 68 at right angles to base 66 and installing bolt or pin 116 through mating holes in brackets 112 and the lower end of support 94. Stand 64 may then be quickly and easily assembled or folded for storage, once other initial adjustments have been completed as desired.

It is to be understood that the present invention is not limited to the embodiments described above, but encompasses any and all embodiments within the scope of the following claims.

I claim:

1. A modular multiple musical instrument stand comprising;
   a base assembly,
   said base assembly having a lateral crossmember parallel to the major axis of said musical instrument stand,
   said lateral crossmember supported by longitudinal support legs at each of said lateral crossmember.
   said lateral crossmember providing support for a plurality of instrument support assemblies each aligned in the vertical plane and perpendicular to said major axis of said musical instrument stand,
   said instrument support assemblies each having first, second, and third instrument support members,
   said instrument support members positioned non linearly upon said instrument support assemblies so as to provide at least three points of support for musical instruments supported by each of said instrument support assemblies, whereby
   said three support points defines a vertical plane perpendicular to said major axis of said musical instrument stand and support any musical instrument placed therein so that the narrowest dimension of said musical instrument is oriented parallel to said major axis of said musical instrument stand in order to conserve space within said musical instrument stand.

2. The musical instrument stand of claim 1 wherein;
   said lateral crossmember is telescopingly adjustable.
3. The musical instrument stand of claim 1 wherein;
   said instrument support assemblies are slidingly adjustable along said lateral crossmember.
4. The musical instrument stand of claim 1 wherein;
   said instrument support members are each telescopingly adjustable upon said instrument support assemblies.
5. The musical instrument stand of claim 1 wherein;
   said instrument support members are padded.
6. A modulator multiple musical instrument stand comprising;
   a base assembly,
   said base assembly having a lateral crossmember parallel to the major axis of said musical instrument stand,
   said lateral crossmember supported by longitudinal support legs at each end of said lateral crossmember,
   said lateral crossmember supporting a plurality of instrument support assemblies each perpendicular to said major axis,
   said instrument support assemblies each having first and second instrument support members,
   a vertical member,
   a horizontal member attached to the upper end of said vertical member and parallel to said major axis,
   said horizontal member having a plurality of third instrument support members,
   said third instrument support members equal in number and corresponding to said instrument support assemblies,
   said instrument support members respectively positioned non linearly upon said instrument support assemblies and said horizontal member so as to provide at least three points of support for musical instruments supported by each of said instrument support members, whereby
   said three support points define a vertical plane perpendicular to said major axis of said musical instrument stand and support any musical instrument placed therein so that the narrowest dimension of said musical instrument is oriented parallel to said major axis of said musical instrument stand in order to conserve space within said musical instrument stand.

7. The musical instrument stand of claim 6 wherein;
   said lateral crossmember is telescopingly adjustable.
8. The musical instrument stand of claim 6 wherein;
   said instrument support assemblies are slidingly ajustable along said lateral crossmember.
9. The musical instrument stand of claim 6 wherein;
   said first and second instrument support members are each positionally adjustable upon said instrument support assemblies.
10. The musical instrument stand of claim 6 wherein;
    said third instrument support members are slidingly adjustable along said horizontal member.
11. The musical instrument stand of claim 6 wherein;
    said instrument support members are padded.

* * * * *